United States Patent [19]

Ohmuta et al.

[11] Patent Number: 5,762,838

[45] Date of Patent: Jun. 9, 1998

[54] METHOD OF PRODUCING NUCLEAR FUEL PELLET

[75] Inventors: Hirofumi Ohmuta; Shigetoshi Nakabayashi, both of Naka-gun, Japan

[73] Assignee: Mitsubishi Nuclear Fuel Co., Tokyo, Japan

[21] Appl. No.: 706,833

[22] Filed: Sep. 3, 1996

[30] Foreign Application Priority Data

Nov. 6, 1995 [JP] Japan .................................. 7-287732

[51] Int. Cl.$^6$ .................................................. G21C 21/00
[52] U.S. Cl. .................................................. 264/0.5
[58] Field of Search ............................................ 264/0.5

[56] References Cited

U.S. PATENT DOCUMENTS

| | | | |
|---|---|---|---|
| 2,968,551 | 1/1961 | North et al. | 75/223 |
| 3,953,556 | 4/1976 | Wilhelm et al. | 264/0.5 |
| 4,020,131 | 4/1977 | Feraday | 264/0.5 |
| 4,061,700 | 12/1977 | Gallivan | 264/0.5 |
| 4,158,681 | 6/1979 | Funke et al. | 264/0.5 |
| 4,174,938 | 11/1979 | Cellier | 425/317 |
| 4,348,339 | 9/1982 | Assmann et al. | |
| 4,383,953 | 5/1983 | Larson et al. | 264/0.5 |
| 4,389,341 | 6/1983 | Gaines, Jr. et al. | 252/638 |
| 4,438,050 | 3/1984 | Dorr et al. | |
| 4,774,051 | 9/1988 | Peehs et al. | 376/419 |
| 4,869,866 | 9/1989 | Lay et al. | 264/0.5 X |
| 4,965,024 | 10/1990 | Wood | 264/0.5 |

FOREIGN PATENT DOCUMENTS

| | | |
|---|---|---|
| 0 316 623 | 5/1989 | European Pat. Off. . |
| 0 416 778 | 3/1991 | European Pat. Off. . |
| 62-180292 | 8/1987 | Japan . |

*Primary Examiner*—Peter A. Nelson
*Attorney, Agent, or Firm*—Oblon, Spivak, McClelland, Maier & Neustadt, P.C.

[57] ABSTRACT

A nuclear fuel green compact is produced by sintering in an atmosphere of reducing gas. A mixed gas of hydrogen and nitrogen to which water vapor is added is used as the reducing gas. By establishing the amount of water vapor added to the mixed gas of hydrogen and nitrogen so that dew point as an indicator is $-15°$ C. or more, the nitrogen content of the produced pellets can be controlled to be equal to or less than 0.0075 wt %.

3 Claims, 2 Drawing Sheets

METHOD OF PRODUCING NUCLEAR FUEL PELLET

BACKGROUND OF THE INVENTION

1. Field of the Invention

This invention relates to a method of producing nuclear fuel pellets for use in nuclear reactors.

2. Background Art

Conventionally, methods of producing nuclear fuel pellets from nuclear fuel powder have been chosen in accordance with the requirements for the nuclear fuel powder which will be the raw materials and for the pellets to be obtained, but generally, the procedures depicted in FIG. 3 have been adopted.

Namely, the nuclear fuel powder which is the raw material is a mixed powder which contains one or more components of a group comprising uranium dioxide, other uranium oxides, plutonium oxide and thorium oxide; in some cases, gadolinium oxide may be optionally added as a neutron absorber. After mixing additives such as lubricant with this raw material powder, pelletization powder is formed by preforming, and then mixed with lubricants. The pelletization powder is compressed by a die press to form a green compact (green pellet). The green compact is sintered in a reducing atmosphere for about 5 hours, at 1800° C. or less, desirably at 1600°~1800° C. The outer periphery of the sintered uranium dioxide pellet is ground by a centerless grinder to a designated size, and then a final inspection is carried out.

The green compact formed in this way is sintered in a furnace in an atmosphere of a reducing gas, which may be any one of pure hydrogen gas, hydrogen-argon mixed gas or hydrogen-nitrogen mixed gas.

However, when pure hydrogen gas or hydrogen-argon mixed gas is used as the reducing gas in the furnace, the cost for producing the pellets is inflated by the high prices of hydrogen and argon. In contrast, by using a mixed gas which contains hydrogen gas and low-priced nitrogen gas, the cost for producing the pellets can be reduced. However, when a mixed gas of hydrogen and nitrogen is used as the atmosphere gas, there is a problem in that an increased amount of nitrogen remains in the sintered pellets as impurities.

On the other hand, the nitrogen-impurity content of pellets is regulated, and in accordance with ASTM (American Society for Testing Materials) standards, the upper limit (standardized value) of the nitrogen impurity content of $UO_2$ pellets, $(U—Pu)O_2$ pellets and $(Gd—U)O_2$ pellets are respectively restricted to 75 μg/g-U, 75 μg/g-(U+Pu) and 75 μg/g-U; and that of $(U—Pu)O_2$ pellets for use in fast breeder reactors is limited to 200 μg/g-(U+Pu).

Reference:

ASTM C 776-89 Standard Specification for Sintered Uranium Dioxide Pellets

ASTM C 833-86 Standard Specification for Sintered (Uranium Plutonium) Dioxide Pellets ASTM C 922-89 Standard Specification for Sintered Gadolinium oxide-Uranium Dioxide Pellets ASTM C 1008-92 Standard Specification for Sintered (Uranium-Plutonium) Dioxide Pellets-Fast Reactor Fuel Moreover, in Japan, Article 4 of "the ministerial ordinance for determining technical criteria related to nuclear fuel material for electric power generation (amended on August 1, S63 (1988), Ordinance No. 39 of the Ministry of International Trade and Industry)" stipulates that the weight percentage of nitrogen content to uranium content in uranium dioxide fuel material must be 0.0075 or less.

However, when a mixed gas of nitrogen and hydrogen is used as the atmosphere gas, it causes trouble in that the nitrogen content of the sintered pellets is over 0.0075 wt %.

SUMMARY OF THE INVENTION

It is therefore the object of this invention to provide a method for producing nuclear fuel pellets, which uses a mixed gas of hydrogen and nitrogen as the reducing gas, and which can suppress the nitrogen content of sintered pellets to below the standardized value.

This invention is accomplished based on the knowledge that when a nuclear fuel green compact is sintered in a mixed gas atmosphere of hydrogen and nitrogen, the nitrogen content of the sintered nuclear fuel pellet can be suppressed by the addition of water vapor into the mixed gas. Furthermore, this invention is accomplished based on the knowledge that the nitrogen-impurity content of the nuclear fuel pellet can be controlled by the amount of water vapor added to the mixed gas, that is, by controlling the dew point of the resulting mixed gas as an indicator of the amount of water vapor.

Namely, the method for producing nuclear fuel pellets in this invention, comprises the step of sintering green compacts of nuclear fuel powder in an atmosphere of reducing gas, and is characterized in that a mixed gas of hydrogen and nitrogen to which water vapor is added is used as the reducing gas.

By using this method, the nitrogen-impurity content of the nuclear fuel pellet can be held below the standardized value, which has been difficult to achieve by conventional sintering methods which use a mixed gas of hydrogen and nitrogen, and it becomes possible to produce inexpensive and high-quality pellets.

The present invention is also characterized in that the water vapor is added to the mixed gas of hydrogen and nitrogen in such an amount that the dew point of the resulting mixed gas is −15° C. or more.

By using the mixed gas of hydrogen and nitrogen whose dew point is controlled by the addition of water vapor to be −15° C. or more, the nitrogen-impurity content of the sintered nuclear fuel pellet can be controlled to be below the standardized value, i.e., 0.0075 wt % or less.

The mixed gas of hydrogen and nitrogen may be obtained from decomposed ammonia gas.

Although in any mixing ratio of hydrogen gas and nitrogen gas, the nitrogen-impurity content of the sintered pellet can be controlled below the standardized value, a less expensive mixed gas can be obtained by using a decomposed ammonia gas as the mixed gas rather than mixing hydrogen gas and nitrogen gas.

Thus, the composition ratio obtained from a decomposed ammonia gas is 75 vol % hydrogen:25 vol % nitrogen.

The nuclear fuel powder may be uranium oxide powder or a mixed powder of uranium oxide and a rare earth metal oxide or plutonium oxide.

DESCRIPTION OF THE PREFERRED EMBODIMENTS OF THE INVENTION

Figure 1:
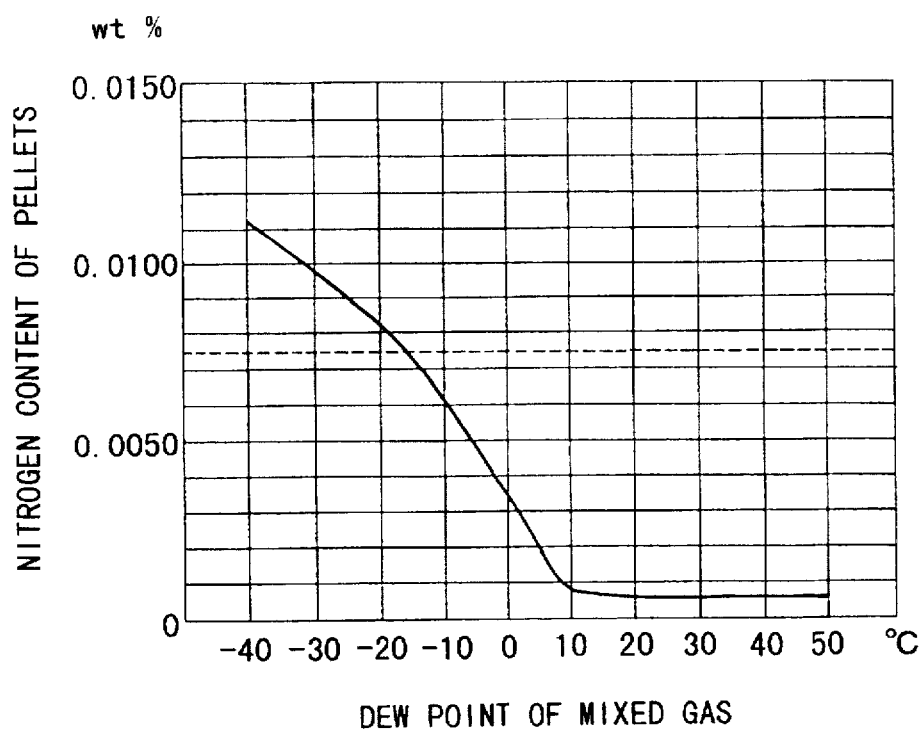
FIG. 1 is a graph showing the relationship between the dew point as an indicator of the amount of water vapor in the mixing gas and the nitrogen content of produced pellets, wherein these pellets were produced according to Example 1 of this invention.

In the method for producing nuclear fuel pellets according to the present invention, when nuclear fuel pellets are produced by sintering green compacts of nuclear fuel powder in an atmosphere of reducing gas, a mixed gas of hydrogen and nitrogen to which water vapor is added is used as the reducing gas.

In regard to the mixed gas, any mixing ratio of hydrogen gas and nitrogen gas is allowable. The mixed gas is generally produced by mixing hydrogen gas and nitrogen gas in a selectively established ratio. In this case, since nitrogen gas is less expensive than hydrogen gas, it is economically desirable that the content of nitrogen gas be as high as possible.

Apart from this, the mixed gas of hydrogen and nitrogen may be produced by decomposition of ammonia gas. In this case, since the composition ratio of the ammonia gas is hydrogen 75 vol %:nitrogen 25 vol %, that of the mixed gas also becomes the same ratio. By using ammonia gas, there is an advantage in that the cost of the mixed gas obtained from the ammonia gas becomes about ⅔ that of a mixed gas produced by mixing the same ratio of hydrogen gas and nitrogen gas.

Then, the amount of water vapor added to the mixed gas is determined so that the dew point of the resulting gas as an indicator becomes $-15°$ C. or more. By controlling the dew point to be $-15°$ C. or more, it is possible to control the nitrogen-impurity content of the pellet to be equal to or less than the abovementioned standardized value of 0.0075 wt %. In contrast, if the dew point is $-15°$ C. or less, the nitrogen-impurity content of the pellet may exceed the standardized value of 0.0075%.

The method for incorporating water vapor into the mixed gas of hydrogen and nitrogen may be any method generally employed in the industrial field, for example a humidification method wherein hydrogen gas, nitrogen gas or a mixed gas of hydrogen-nitrogen is aeration-bubbled into pure water adjusted to a designated temperature in a bubbling tank, or a method of adding water vapor in a designated ratio into hydrogen gas, nitrogen gas or a mixed gas of hydrogen and nitrogen.

As described above, the nuclear fuel green compact is sintered in an atmosphere in which water vapor is added to a mixed gas of hydrogen and nitrogen in a designated ratio, at a temperature of $1600°–1800°$ C., for 2–8 hours. In this sintering process, it is presumed that an equilibrium reaction as shown in the following equation (1) takes place. In this equation (1), a, b, c, d or e respectively express appropriate numbers of molecules.

$$aUO_2 + bH_2 + cN_2 = dUNx + eH_2O \quad (1)$$

That is, it becomes clear that if sintered in an atmosphere of a mixed gas of hydrogen and nitrogen into which water vapor is not added, the equilibrium of the above formula inclines toward the right side in which uranium nitrides are produced and the nitrogen content ratio of the sintered pellets becomes high, and on the other hand, if sintered in an atmosphere of a mixed gas of hydrogen and nitrogen into which water vapor is added, the equilibrium inclines toward the left side in which the uranium nitrides are decomposed and the nitrogen content ratio of sintered pellets is controlled.

Accordingly, when the nuclear fuel green pellets are sintered in an atmosphere of a mixed gas of hydrogen and nitrogen, by controlling the amount of water vapor added to the mixed gas of hydrogen and nitrogen, the nitrogen-impurity content of the sintered nuclear fuel pellets can be controlled. Thus, the nitrogen content of the pellets can be controlled to be equal to or less than the standardized value of 0.0075 wt %.

As described above, according to the embodiments of this invention, by using the mixed gas of hydrogen and nitrogen as the atmosphere in sintering nuclear fuel green compacts, the cost of producing pellets can be reduced and the nitrogen content of the pellets can be controlled to be equal to or less than the standardized value of 0.0075 wt %. Additionally, by using ammonia gas in producing the mixed gas, the production cost of pellets can be further reduced.

Next, examples of the invention will be explained.

EXAMPLE 1

A poreformer for adjustment of void percentage and a lubricant such as zinc stearate were added to uranium dioxide powder produced from an aqueous solution of uranyl fluoride by the ADU method, and the resulting mixture was blended.

Then the mixed powder was processed by a granulation process and compressed by die press to form a green compact. The green compact was sintered in a furnace in an atmosphere of a mixed gas of 75 vol % hydrogen and 25 vol % nitrogen, at $1750°$ C., for about 5 hours. The atmosphere in the furnace was humidified or controlled so that the dew point, which served as an indicator of the amount of water vapor, was within $40°$ C.–$+50°$ C.

In this example, the relationship between the dew point of the mixed gas and the nitrogen content of the sintered pellet was as shown in FIG. 1.

Based on the result shown in FIG. 1, the nitrogen content of the sintered pellet can be controlled by the humidity level (dew point) of the mixed gas of hydrogen-nitrogen. Moreover, when the dew point was $-15°$ C., the nitrogen content of the pellet corresponded to 0.0075 wt %. Accordingly, by controlling the dew point to be $-15°$ C. or more, the nitrogen content of pellet can be controlled to be equal to or less than 0.0075 wt %.

EXAMPLE 2

A poreformer for adjustment of void percentage and a lubricant such as zinc stearate were added to uranium dioxide powder produced from an aqueous solution of uranyl fluoride by the ADU method, and the resulting mixture was blended.

Then the mixed powder was processed by a granulation process and compressed by die press to form a green compact.

In atmospheres of hydrogen-nitrogen mixed gas of various mixing ratios such as 4 vol % hydrogen-96 vol % nitrogen, 25 vol % hydrogen-75 vol % nitrogen, 50 vol % hydrogen-50 vol % nitrogen and 75 vol % hydrogen-25 vol % nitrogen, or in an atmosphere of pure hydrogen gas as a comparative example, these green compacts were respectively sintered in a furnace at $1750°$ C., for 5 hours. The atmosphere in the furnace was humidified or controlled so that the dew point of the resulting mixed gas as an indicator of the amount of water vapor was +15° C.

Figure 2:
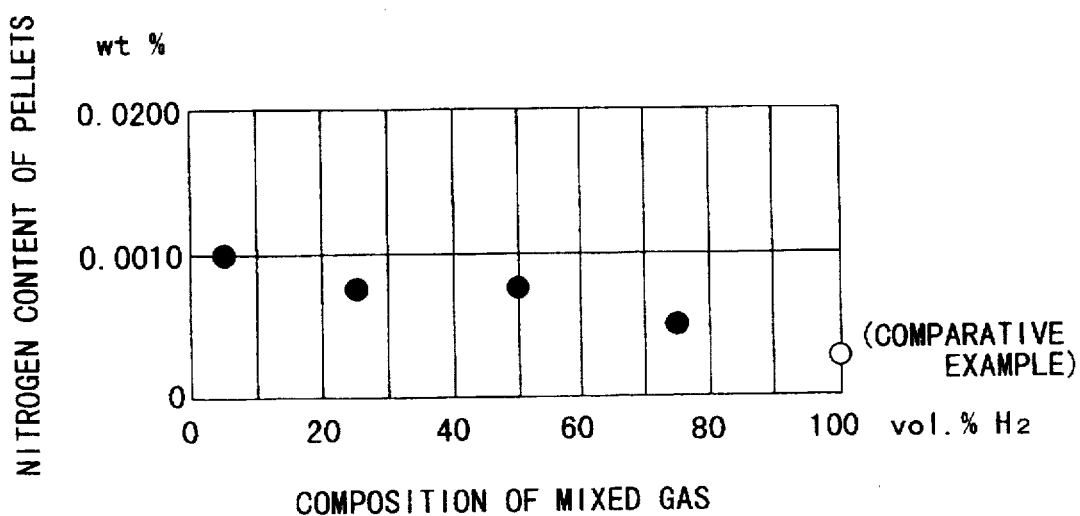
FIG. 2 is a graph showing the relationship between the composition ratio of hydrogen in the mixed gas and the nitrogen content of the produced pellets, wherein these pellets were produced according to Example 2 of this invention.
Figure 3:
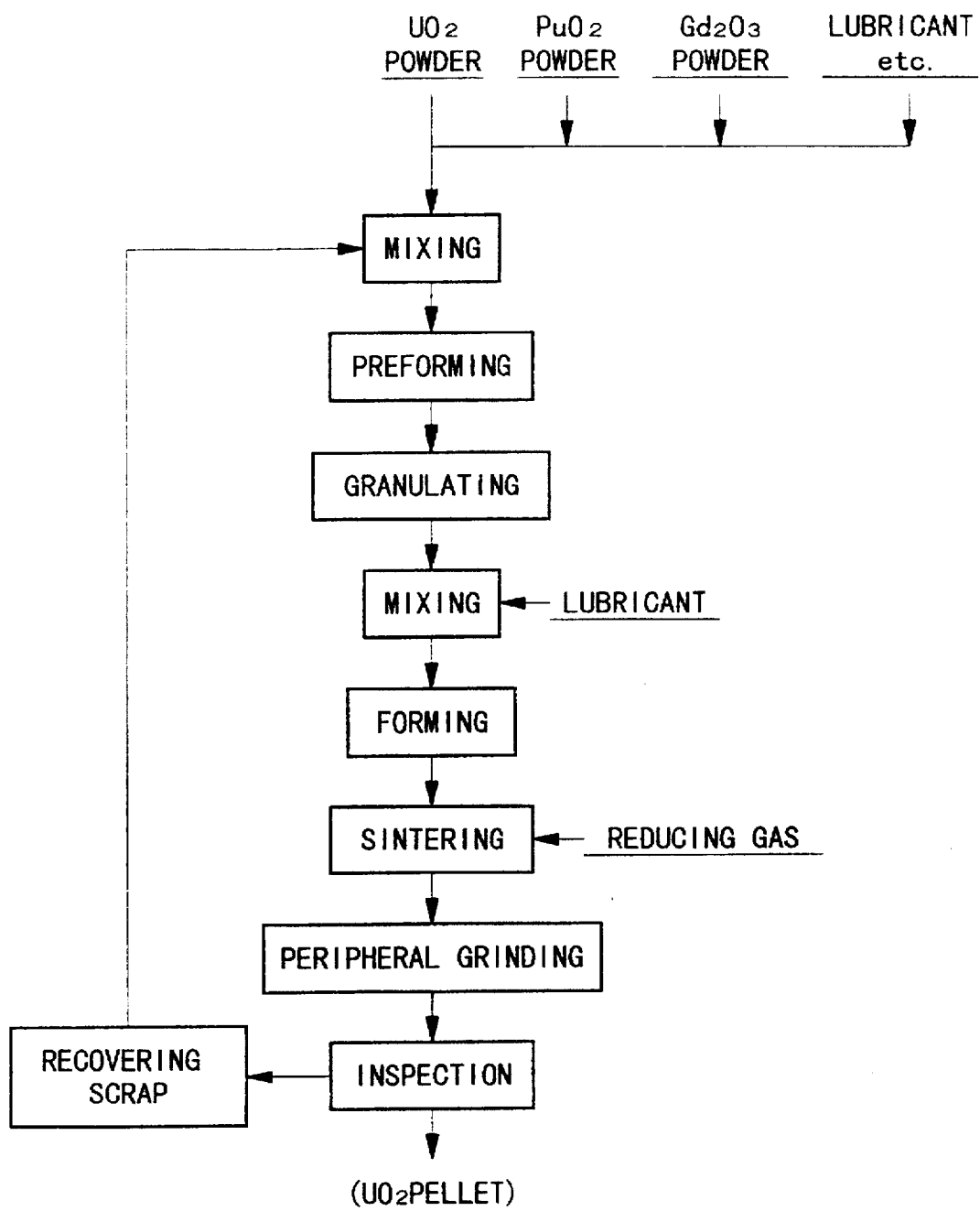
FIG. 3 is a flowchart showing a method for producing nuclear fuel pellets from raw material powder.

The relationship between the composition of the hydrogen-nitrogen mixed gas (hydrogen vol %) and the nitrogen content of the sintered pellet was as shown in FIG. 2, and when the composition of the hydrogen-nitrogen mixed gas was between 4 vol % hydrogen and 75 vol % hydrogen, the nitrogen content of every pellet was 0.0010 wt % or less and below the standardized value.

Furthermore, in the case of pure hydrogen gas as the comparative example, the nitrogen content was 0.0003 wt %.

EXAMPLE 3

A poreformer for adjustment of void percentage and a lubricant such as zinc stearate were added to uranium dioxide powder produced from an aqueous solution of uranyl fluoride by the ADU method, and the resulting mixture was blended. Then the mixed powder was processed by a granulation process and compressed by a die press to form a green compact.

In an atmosphere of mixed gas of 50 vol % hydrogen-50 vol % nitrogen, or in an atmosphere of pure hydrogen gas as a comparative example, at 1600, 1650, 1700, 1750 or 1800° C., for 2, 3, 5 or 8 hours, these green compacts were respectively sintered in a furnace. The atmosphere in the furnace was humidified or controlled so that the dew point of the resulting mixed gas as an indicator of the amount of water vapor became +15° C.

As depicted in Table 1, the nitrogen content of all of the sintered pellets produced in the respective sintering conditions were less than 0.0010 wt %.

TABLE 1

| | Sample No. | | | | | | | |
|---|---|---|---|---|---|---|---|---|
| | ① | ② | ③ | ④ | ⑤ | ⑥ | ⑦ | ⑧ |
| Sintering Condition | | | | | | | | |
| Sintering Temperature (°C.) | 1600 | 1650 | 1700 | 1750 | 1800 | | 1750 | |
| Sintering Time (h) | | | 5 | | | 2 | 3 | 8 |
| $H_2/N_2$ ratio (vol % $H_2$) | | | | 50 | | | | |
| Dew Point (°C.) | | | | 15 | | | | |
| Nitrogen Content ($\times 10^4$ wt %) | 3 | 5 | 4 | 5 | 6 | 4 | 5 | 6 |

EXAMPLE 4

A poreformer for adjustment of void percentage and a lubricant such as zinc stearate were added to uranium dioxide powders produced by the IDR method, the AUC method or the ADU method from uranyl nitrate solution, and then the mixture was blended. Then the mixed powder was processed by a granulation process and compressed by a die press to form a green compact. In an atmosphere of a mixed gas of 50 vol % hydrogen-50 vol % nitrogen, or in an atmosphere of pure hydrogen gas as a comparative example, each green compact was respectively sintered in a furnace, at 1750° C., for 5 hours. The atmosphere in the furnace was humidified or controlled so that the dew point of the resulting mixed gas as an indicator of the amount of water vapor was +15° C.

The nitrogen contents of the produced sintered pellets are shown in Table 2, all of them, including that of the pellets sintered in an atmosphere of pure hydrogen gas, were less than 0.0010 wt %.

TABLE 2

| | Sample No. | | |
|---|---|---|---|
| | ① | ② | ③ |
| Raw Materials $UO_2$ Powder Production | IDR Method | AUC Method | ADU Method |
| Sintering Condition | | | |
| Sintering Temperature (°C.) | | 1750 | |
| Sintering Time (h) | | 5 | |
| $H_2/N_2$ ratio (vol % $H_2$) | | 50 | |
| Dew Point (°C.) | | 15 | |
| Nitrogen Content ($\times 10^4$ wt %) | 7 | 8 | 6 |

EXAMPLE 5

A poreformer for adjustment of void percentage and a lubricant such as zinc stearate were added to uranium dioxide powder mixed with 6 wt % of gadolinium oxide powder. Then the mixed powder was processed by a granulation process and compressed by a die press to form a green compact. In an atmosphere of a mixed gas of 50 vol % hydrogen-50 vol % nitrogen, this green compact was sintered in a furnace, at 1750° C., for 5 hours. The atmosphere in the furnace was humidified or controlled so that the dew point of the resulting mixed gas as an indicator of the amount of water vapor became +15° C.

The nitrogen content of the produced sintered pellets was 0.0007 wt %.

Additionally, in each above-described example, although uranium dioxide powder or a mixed powder of uranium dioxide and gadolinium oxide was used as a raw material, by applying the powder production described in the above examples, a nuclear fuel green compact may be produced from uranium dioxide mixed with 5 weight % of plutonium oxide. Furthermore, this invention may be applied in sintering various other nuclear fuel green compacts.

Finally, the present application claims the priority of Japanese Patent Application No. 7-287732, filed Nov. 6, 1995, which is herein incorporated by reference.

What is claimed is:

1. A method of producing a nuclear fuel pellet, comprising the steps of:

preparing a nuclear fuel green compact;

producing a mixed gas of hydrogen and nitrogen by decomposing ammonia gas;

aeration-bubbling said mixed gas into water, thereby producing a reducing gas having a dew point of not less than −15° C.; and sintering said green compact in said reducing gas, thereby producing a nuclear fuel pellet having a nitrogen content of 0.0075 wt % or less.

2. The method according to claim 1, wherein said sintering step comprises effecting the sintering at a temperature of 1600°–1800° C. for 2 to 8 hours.

3. A nuclear fuel pellet produced by the method of claim 1 having a nitrogen content of 0.0075 wt % or less.

* * * * *